United States Patent
Quintus (10) Patent No.: US 10,596,975 B1
(45) Date of Patent: Mar. 24, 2020

(54) MOUNTING SYSTEM WITH PIVOT LOCKING FEATURES

(71) Applicant: UNDERCOVER, INC., Ann Arbor, MI (US)

(72) Inventor: James Gerard Quintus, Springfield, MO (US)

(73) Assignee: UNDERCOVER, INC., Ann Arbor, MI (US)

( * ) Notice: Subject to any disclaimer, the term of this patent is extended or adjusted under 35 U.S.C. 154(b) by 0 days.

(21) Appl. No.: 16/172,452

(22) Filed: Oct. 26, 2018

(51) Int. Cl.
  *B60R 9/06* (2006.01)
  *B60R 11/06* (2006.01)
  *F16C 11/10* (2006.01)
  *B60R 11/00* (2006.01)

(52) U.S. Cl.
  CPC .............. *B60R 9/065* (2013.01); *B60R 11/06* (2013.01); *F16C 11/103* (2013.01); *B60R 2011/004* (2013.01); *B60R 2011/0085* (2013.01)

(58) Field of Classification Search
  CPC .......... E05B 65/48; E05B 65/50; E05B 63/24; E05B 67/383; E05C 19/08; B60R 11/06; B60R 9/06; B60R 2011/0085
  See application file for complete search history.

(56) References Cited

U.S. PATENT DOCUMENTS

| | | | |
|---|---|---|---|
| 2,626,182 A | 1/1953 | Troth et al. | |
| 3,664,704 A | 5/1972 | Ellis | |
| 3,805,325 A * | 4/1974 | Lee | E05C 19/08 16/262 |
| 4,045,064 A | 8/1977 | Okada | |
| 4,085,961 A | 4/1978 | Brown | |
| 4,105,235 A | 8/1978 | Thiel | |
| 4,135,273 A * | 1/1979 | Holmes | E05D 11/0027 16/319 |
| 4,564,167 A | 1/1986 | Smith | |
| 4,584,739 A | 4/1986 | Konen | |
| 4,750,774 A | 6/1988 | Pickering | |
| 4,883,319 A * | 11/1989 | Scott | B60N 2/22 297/354.1 |
| 5,103,528 A * | 4/1992 | Olson | F25D 23/064 16/2.2 |
| 5,398,987 A | 3/1995 | Sturgis | |
| 5,570,498 A | 11/1996 | Hipkiss et al. | |

(Continued)

OTHER PUBLICATIONS

Potentially Related U.S. Appl. No. 12/354,330, filed Jan. 15, 2009, published as US 2009/0200351 on Aug. 13, 2009.

*Primary Examiner* — Adam J Waggenspack
(74) *Attorney, Agent, or Firm* — The Dobrusin Law Firm, P.C.; Bryan S. Lemanski (57) ABSTRACT

A toolbox comprising: a container; a mounting system comprising: a mounting plate adapted to connect the toolbox to a bed of a truck; a support plate connected to the container; a pivot lock pivotally connecting all or a portion of the mounting plate and support plate; wherein the mounting plate and the support plate are pivotally connected together so that the container is movable relative to the bed of the truck, and wherein the pivot lock assists in connecting the mounting plate and the support plate together so that the support plate is pivotally movable relative to the mounting plate, and the pivot lock prevents the support plate from being detached from the mounting plate.

20 Claims, 8 Drawing Sheets

(56) References Cited

U.S. PATENT DOCUMENTS

| | | | |
|---|---|---|---|
| 5,667,116 A * | 9/1997 | Reinhart | B60R 9/055 224/315 |
| 5,842,615 A | 12/1998 | Goodness | |
| 6,203,087 B1 | 3/2001 | Lance et al. | |
| 7,309,093 B2 | 12/2007 | Ward | |
| 7,488,021 B1 | 2/2009 | Roos et al. | |
| 9,669,751 B2 | 6/2017 | Anderson et al. | |
| 9,889,825 B1 | 2/2018 | Kehder | |
| 9,914,383 B2 | 3/2018 | Anderson et al. | |
| 10,065,567 B2 | 9/2018 | Garrison et al. | |
| 2003/0020379 A1 * | 1/2003 | Larsen | E05B 63/04 312/218 |
| 2003/0189353 A1 | 10/2003 | Moore | |
| 2006/0279099 A1 | 12/2006 | Ranka et al. | |
| 2007/0029822 A1 | 2/2007 | Monts de Oca | |
| 2007/0102949 A1 | 5/2007 | Andrews | |
| 2007/0152003 A1 | 7/2007 | Dollar, Jr. | |
| 2009/0200350 A1 | 8/2009 | Brallier et al. | |
| 2009/0200351 A1 * | 8/2009 | Brallier | B60R 9/00 224/404 |
| 2016/0280144 A1 | 9/2016 | Hemphill et al. | |

\* cited by examiner

MOUNTING SYSTEM WITH PIVOT LOCKING FEATURES

FIELD

The present teachings generally relate to toolboxes, more specifically toolboxes that include a container and a mounting system that has a mounting plate, a support plate, and a pivot lock that pivotally connects and secures the mounting system and the truck.

BACKGROUND

Typically, toolboxes with mounting systems are locked into fixed positions in order to prevent theft. Specifically, the toolboxes cannot swing freely when the lock is secured. Many toolboxes may be locked at the wall or bed of the truck. Many toolboxes can be locked to the truck at the hinges, panels, or base of the toolbox. However, many toolboxes that lock at the wall or bed of the truck require removal of the lock to change positions on the truck, which can leave the mounting system in an unsecure position that is vulnerable to theft. Further, many toolboxes that lock at the hinges, walls, or base of the toolbox do not allow free swinging of the toolbox when secured.

Examples of some toolbox mounting systems may be found in U.S. Pat. Nos. 7,309,093; and 10,065,567 and U.S. Patent Application Publication Nos. 2003/0189353; 2009/0200350; and 2009/0200351 all of which are incorporated by reference herein for all purposes. What is needed is a mounting system that can swing freely while the mounting system is locked. What is needed is a mounting system that can swing freely and prevents removal of the toolbox from the truck. What is needed is a mounting system that has one lock for securing the toolbox in a fixed position and a second lock for securing the toolbox in a swingable position relative to the truck. It would be attractive if a toolbox could be swung between the wall and the tailgate of the truck without unlocking the toolbox so that the toolbox is removable.

SUMMARY

It would be attractive if a toolbox could be swung between the wall and the tailgate of the truck while in a locked position and engaged position The present teachings meet one or more present needs by providing: a toolbox comprising: a container; mounting system comprising: a mounting plate adapted to connect the toolbox to a bed of a truck; a support plate connected to the container; a pivot lock pivotally connecting all or a portion of the mounting plate and support plate; wherein the mounting plate and the support plate are pivotally connected together so that the container is movable relative to the bed of the truck, and wherein the pivot lock assists in connecting the mounting plate and the support plate together so that the support plate is pivotally movable relative to the mounting plate, and the pivot lock prevents the support plate from being detached from the mounting plate.

The present teachings provide a mounting system that can swing freely while the mounting system is locked. The present teachings provide a mounting system that can swing freely and prevents removal of the toolbox from the truck. The present teachings provide a mounting system that has one lock for securing the toolbox in a fixed position and a second lock for securing the toolbox in a swingable position relative to the truck. The present teachings provide a toolbox could be swung between the wall and the tailgate of the truck without unlocking the toolbox so that the toolbox is removable.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The toolbox may function to pivotally connect a truck to allow movement of the toolbox on a rotational axis while staying secured to the truck. The toolbox may be a container. The toolbox may have a lid. The toolbox may not have a lid. The toolbox may connect to a discrete mounting system. The toolbox may include a plurality of toolbox attachment holes. The toolbox may connect to the mounting system through the plurality of toolbox attachment holes at one or more locations, two or more locations, three or more locations, four or more locations, five or more locations; or a plurality of locations. The base of the toolbox may contact the truck, a wheel well, or both. The base of the toolbox may be elevated above the truck, the truck bed, the wheel well, or a combination thereof. The toolbox may include a plurality of toolbox mounting holes.

The plurality of toolbox mounting holes may function to connect a toolbox and the mounting system. The toolbox mounting holes may substantially sized to each receive one or more fasteners (e.g., a plurality of screws, rivets, or bolts). The toolbox mounting holes may be on any side of the toolbox. The toolbox mounting holes may attach the toolbox and a mounting system. Specifically, the toolbox mounting holes may attach at the support plate of the mounting system. Preferably, the toolbox mounting holes may be located on an end of the tool box. The mounting holes may be located on an end of the tool box closest to a wall, a pivot point, or both. The toolbox mounting holes may be on any side of the container.

The container may function to organize an assortment of tools. The container may have three or more sides (i.e., a triangular, rectangular, pentagonal, hexagonal, heptagonal, octagonal, or any combination thereof). The container may have only one side (i.e., oval, circular, spherical, or any combination thereof). Preferably, the container includes an open area for receiving and securing items within the container so that the items may be both located within the container and organized within the container. The container may have a base. The container may not have a base. The base of the container may be the one or more sides oriented toward the ground. The base of the container may contact the bed of the truck. The base of the container may be elevated above the bed of the truck. The container may be metallic, plastic, or any combination thereof. The container may be formed by blow molding, injection molding, thermoforming, extrusion blow molding, vacuum molding, compression molding, or a combination thereof. The container may have a lid.

The lid may function to cover the container and secure an assortment of tools. The lid may be metallic, plastic, or any combination thereof. The lid may be removable from the container. The lid may include a lid lock. The lid may not include a lid lock. The lid may only be secured to the container by the lid lock. The lid may be pivotally connected to the container by one or more lid hinges.

The one or more lid hinges may function to create a pivotal connection between the lid and the container. The lid hinge may be metallic, plastic or both. The lid hinge may be removable from the lid, the container, or both. The lid hinge may be unremovable. The lid hinge may work with the lid lock to secure the lid to the container.

The lid lock may function to secure the lid to the container. The lid lock may be a key lock, a code combination lock, a pad lock, a hasp, or any combination thereof. The lid lock may be centered on the lid. The lid lock may be off-centered toward any edge of the lid. The key used to move the lid lock into the locked position may be the same key used to move the pivot lock into the locked position. The pivot lock may be a part of the mounting system.

The mounting system may function to create a secure pivotal connection between the toolbox and the truck. The mounting system may include a support plate and a mounting plate that move together as a hinge to allow pivotal movement of the toolbox in the truck. The mounting system may allow movement on or about a rotational axis. The rotational axis may be perpendicular and vertical relative to a bed of the truck. For example, the rotational axis may extend normal to the bed of the vehicle. The mounting system may allow pivotal movement around the rotational axis in the horizontal direction (e.g., a direction parallel to a plane of the bed of the vehicle) but may prohibit vertical movement or axial movement of the toolbox along the rotational axis. The mounting system may prevent a user from "lifting" the toolbox off of the hinges in a vertical direction. The mounting system may connect to the toolbox at the support plate. Specifically, the support plate may connect to the toolbox at the plurality of toolbox mounting holes. The mounting system may be connected to the truck at mounting plate. Specifically, the mounting plate may be connected to the truck at the plurality of truck mounting holes.

The plurality of truck mounting holes may function to connect the mounting plate and the truck. The truck mounting holes may be substantially sized to receive screws or bolts. The truck mounting holes may be located in a vertical sidewall of a vehicle bed. The truck mounting holes may support any connection feature sufficient to support a toolbox.

The support plate may function to create a connection between the toolbox and the mounting plate. The support plate may be substantially L-shaped, flat, include curves, include bends, include sections that are perpendicular, or a combination thereof. The support plate may include a plurality of toolbox mounting holes. The toolbox mounting holes may connect the support plate and the toolbox. The support plate may include one or more hinges; two or more hinges; three or more hinges; four or more hinges; five or more hinges; or a plurality of hinges. The support plate may pivotally connect the mounting plate at the hinges, the pivot lock, the one or more pivot bushings, or any combination thereof. The support plate and the mounting plate may be sufficiently sturdy to support the weight of a toolbox. The support plate may include one or more slots.

The one or more slots may function to mate and provide a stable connection between the pivot lock and support plate. The one or more slots may not mate with the pivot lock. The slot may be substantially the same diameter as an engagement tab and a cylinder in the unlocked position of the pivot lock. The slot may be used to create a locked position with the support mount and pivot lock when the cylinder of the pivot lock is in a locked position over the slot. For example, a cylinder of the pivot lock may extend through one of the slots and when rotated the cylinder may be moved into a locked position where the cylinder is prevented from being moved through the slot. The one or more slots may be oblong. The one or more slots may have a length that is greater than the width. The length may have a ratio to the width of about 1.1:1 or more, about 1.2:1 or more, about 1.5:1 or more, about 1.7:1 or more, or about 2:1 or more. The length may have a ratio to the width of about 5:1 or less, about 4:1 or less, or about 3:1 or less. The slots may be sufficiently wide so that the cylinder can extend through the slots when the cylinder is aligned in a length of the slots. The width of the slots may be sufficiently narrow so that the cylinder is prevented from extending through the slots when the cylinder is rotated to be perpendicular to a width of the slots. The one or more slots may be adjacent to the locking aperture.

The locking aperture may function to mate with the hasp of the mounting plate so that the mounting plate is prevented from rotating relative to the support plate. The hasp may sufficiently passes through the locking aperture such that at least one portion of the hasp is on the opposite side of entry into the locking aperture, forming a mating configuration.

The locking aperture may be substantially centered on the support plate. The locking aperture may be off-centered on the support plate. The locking aperture may be adjacent to the one or more slots. The locking aperture may be round, oval, square, triangular, rectangular, or a combination thereof. The locking aperture may be sufficiently large so that a hasp may extend through the locking aperture. The locking aperture may be centered between two or more slots. The locking aperture may be adjacent to the one or more plate stiffeners.

The one or more plate stiffeners may function to enhance the structural integrity of the support plate. The support plate may have enhanced structural integrity by the one or more plate stiffeners including bending, curving, crumpling, twisting, breaking, severing or any combination. The one or more plate stiffeners may be attached at the top of the support plate, the bottom of the support plate, or both. The one or more plate stiffeners may be substantially centered on the on the support plate. The one or more plate stiffeners may be attached anywhere that enhances the structural integrity of the support plate. The one or more plate stiffeners may be formed within the mounting plate, the support plate, or both. For example, the mounting plate or support plate may be stamped to include one or more plate stiffeners. The plate stiffeners may provide stiffness in a direction perpendicular to the rotational axis, parallel to the rotational axis, or both. The plate stiffeners may be adjacent to the one or more hinges of the support plate.

The one or more hinges may function to assist in creating a pivotal connection between the mounting plate and support plate. The hinges may assist the mounting plate and the support plate in changing the mounting system between a closed position and an open position. The hinges may be made of the same material as the support plate (e.g., steel, iron, stainless steel, aluminum, titanium, a polymer). The hinges may not be the same material as the support plate. The one or more hinges may move on the rotational axis. The one or more hinges may connect the one or more pivot bushings and the support plate. The one or more hinges may contact the pivot lock. The one or more hinges may assist the pivot lock with moving on the rotational axis. The one or more hinges may contact the mounting plate, be part of the mounting plate, be part of the support plate, be part of a pivot bushing or a combination thereof.

The mounting plate may function to be connect the support plate to a wall of a vehicle. The mounting plate may include truck mounting holes. The mounting plate may be metallic, plastic, or any combination thereof. The mounting plate may be sufficiently rigid and/or strong that the mounting plate may support the weight of the container and its contents. The mounting plate may be connected to the vehicle at the truck mounting holes. The mounting plate may include one or more hinge tabs. The one or more pivot bushings may slide over the one or more hinge tabs of the mounting plate. The mounting plate may include the one or more retainer holes; two or more retainer holes; three or more retainer holes; four or more retainer holes; five or more retainer holes; or a plurality of retainer holes. The one or more pivot bushings and the mounting plate may connect by one or more snap tabs of the one or more pivot bushings at the retainer holes of the mounting plate. The one or more hinge tabs of the mounting plate may work with the pivot bushings and mate with the hinges of the support plate to form a pivotal connection with the mounting plate and support plate. The mounting plate may include one or more engagement tabs. The mounting plate may mate with the pivot lock to form a pivotal connection at the engagement tab. The mounting plate may include a hasp. The hasp may mate with the locking aperture to assist with securing the mounting plate and support plate.

The hasp may function to assist with securing the support plate and the mounting plate in a closed position. The hasp may extend through the locking aperture of the support plate such that a lock may be secured to the hasp. The hasp may be secured by a padlock, code combination lock, or any lock sufficient to secure the support plate and the mounting plate in closed position. The hasp may be substantially centered on the mounting plate. The hasp may be off-centered from the mounting plate. The hasp when in connection with a lock may prevent movement of the mounting plate and the support plate relative to each other. The hasp may be adjacent to the one or more retainer holes.

The one or more retainer holes may function to create a connection between the one or more snap tabs of the pivot bushings and the mounting plate. The one or more pivot bushings may include one or more snap tabs that may extend into the retainer holes and prevent the snap tabs from moving relative to the mounting plate. The one or more retainer holes may receive snap tabs of the pivot busing that extends through and cannot be removed without damaging the snap tabs. The one or more retainer holes may be circular, triangular, rectangular, pentagonal, hexagonal, heptagonal, octagonal, polygonal, or any combination thereof. The one or retainer holes may be an aperture. The one or more retainer holes may be an indent. The one or more retainer holes may assist the one or more hinge tabs to form a connection with the one or more pivot bushings. The one or more retainer holes may be located proximate to the hinge tabs so that when a pivot bushing extends over the hinge tabs the pivot bushings are located in place. The one or more retainer holes may be adjacent to the one or more hinge tabs.

The one or more hinge tabs may function to create a connection between the slide of the one or more pivot bushings and the mounting plate. The one or more hinge tabs may provide a rigid feature to support the container and for the container to rotate about while the pivot bushing may provide a low friction pivot surface for the hinge to rotate about. The one or more hinge tabs may mate with the slide of the one or more pivot bushings to form friction fit. The one or more hinge tabs may extend from the mounting plate. The mounting plate may include one or more, two or more, three or more, or even four or more hinge tabs. The hinge tabs may point towards an opposing hinge tab. The hinge tabs may face or point away from other hinge tabs. Two hinge tabs may face each other and a third hinge tab may face away from the other two hinge tabs. The hinge tabs may be located so that a hinge is sandwiched between two opposing hinge tabs. The hinge tabs may be formed in a sheet of material. The hinge tabs may be substantially flat. The hinge tabs may have a rounded upper surface. A length of the hinge tabs may be shorter than a length of hinge. For example, if a hinge tab is inserted into a hinge the hinge tab will not extend from a first side to a second side of the hinge. The hinge tabs be smaller than an inner cross-sectional thickness of a hinge. The hinge tabs may be free of a direction connection to a hinge. The one or more hinge tabs and the one or more pivot bushings may move substantially in unison when the pivot bushing is pivotally connected to the one or more hinges of the support plate and moving on the rotational axis. The hinge tabs may be covered by a pivot bushing. The pivot bushing may be located between the hinge and the hinge tabs.

The one or more pivot bushings may function to allow pivotal movement between the support plate and mounting plate in the rotational axis. The pivot bushings may connect the hinge tab to the hinge. The pivot bushings may directly contact a hinge. The pivot bushing may extend in the axial direction. The hinge may rotate about the pivot bushing. The pivot bushing may be made of a softer material than the hinge so that the hinge rotates about the hinge bushing in a low friction manner. The pivot bushing may be metal, a polymer, plastic, a coated metal, a coated polymer, include Teflon, include Teflon coating, be hardened, or a combination thereof. The one or more pivot bushing may include a bushing body. The one or more pivot bushings may include a slide. The one or more pivot bushings may include one or more snap tabs; two or more snap tabs; three or more snap tabs; four or more snap tabs; five or more snap tabs; or a plurality of snap tabs. The bushing body may form a bearing surface when inserted into the hinges of the support plate. A bearing surface may be a surface that one or more hinges of the support plate and pivot bearing move about the rotational axis. The one or more pivot bushings may form a friction fit with the one or more hinge tabs of the mounting plate at the slide. The one or more pivot bushings and the one or more hinges of the support plate may form a pivotal connection. Specifically, the bushing body of the pivot bushings may contact the hinges of the support plate.

The bushing body may function to create a pivotal connection between the one or more pivot bushing and the one or more hinges of the support plate. The bushing body may be complementary in shape to an opening in the hinge. The bushing body may fit within the opening in the hinge so that the support plate is supported on the bushing body by the connection between the pivot bushing and the bushing. The bushing body may insert partially into one end of the one or more hinges of the support plate. The bushing body may be longer than the hinge of the support plate and insert fully into one end of the hinge and extend through the hinge. The bushing body may insert on one end of the hinge and extend beyond the second end of the hinge such that at least one portion of the bushing body extends beyond the first end and the second end of the hinge. The bushing body may be shorter than a hinge so that the bushing body does not extend all of a way through the hinge. The bushing body may be substantially round. The bushing body may be cylindrical. The bushing body may be separated from a slide by a shoulder. When the bushing body is inserted into a hinge, the hinge may rest upon the shoulder. The shoulder may have a cross-sectional thickness that is greater than the bushing body. The shoulder may have a flat surface. The shoulder may be at an end of the bushing body. The shoulder may control spacing between the mounting plate and the support plate, the hinges and the pivot lock, or both The bushing body may be adjacent to the one or more snap tabs.

The one or more snap tabs may function to create a connection between the one or more retainer holes of the mounting plate and the one or more pivot bushings. The one or more snap tabs may be in the slide of the one or more pivot bushings. The one or more snap tabs may assist to create a friction fit between the slide of the one or more pivot bushings and the one or more hinge tabs of the mounting plate. The one or snap tabs may be circular, triangular, rectangular, pentagonal, hexagonal, heptagonal, octagonal, polygonal, angled, pointed, curved, rounded or any combination thereof. The one or more snaps may be angled so that the snaps extend into the retainer holes in a first direction and are prevented from being removed from the retainer holes in a second direction. The one or more snaps may have one angled wall and one flat wall. The flat wall once inserted may prevent the snap tabs from being removed. The one or more snap tabs may substantially hook to the one or more retainer holes of the mounting plate.

The slide may function to create a friction fit between the one or more pivot bushings and the one or more hinge tabs of the mounting plate. The slide functions to connect the pivot bushing to a hinge tab. The slide may be a recess that the hinge tab extends into. The slide may be an opening in an end of the pivot bushing. The slide may be an opening in a side of the pivot bushing. The slide may allow the hinge tab to slide into the pivot bushing in a first direction and may prevent the hinge tab from sliding in a second opposing direction. The slide may substantially cover the one or more hinge tabs of the mounting plate. The slide may include one or more snap tabs. The one or more snap tabs may be located substantially opposite of the bushing body. Preferably, the snap tabs are located within an opening within the slide. The slide may include two opposing walls. The snap tabs may be located on two opposing walls. The snap tabs may face each other. The snap tabs may be symmetrically located opposite each other. The snap tabs may be offset relative to each other. The slide may be located on a hinge tab that is located opposite an engagement tab.

The engagement tab may function to engage the tube of the pivot lock in the rotational axis. The engagement tab may mate with the pivot lock. The engagement tab may allow pivotal movement of the pivot lock. The engagement tab may directly extend into a pivot lock. The engagement tab may assist in securing the support plate and mounting plate when the pivot lock is in a locked position. The engagement tab may be identical to a hinge tab, but may receive the pivot lock instead of a pivot bushing. The teachings of the hinge tab may be incorporated herein as to the engagement tab. The engagement tab may assist preventing the pivot lock from being removed when the pivot lock is secured on the mounting plate. The engagement tab may pivotally connect to the tube of the pivot lock.

The tube may function to create a pivotable connection between the pivot lock and the engagement tab. Specifically, the tube may function to allow the pivot lock to pivotally move about the rotational axis. The tube may include a first end and a second end. The tube may include one or more recesses, holes, apertures, or a combination thereof that receive all or a portion of an engagement tab. The tube may partially receive the engagement tab in the first end of the tube. The tube may form a pivotal connection at the first end, second end, or both. The tube may be free of connection on the first end or second end. The tube may only be supported on one end. The tube may be supported when the pivot lock is connected to the engagement tab and when the cylinder is connected. The tube may contact the one or more hinges of the support plate, the engagement tab of the mounting plate, or both. The pivot lock includes the tube.

The pivot lock may function to secure the mounting plate and support plate in a locked position and an engaged position. The pivot lock may function to prevent movement of the container in an axial direction relative to the rotational axis when the pivot lock is installed, in an engaged position, or both. The pivot lock may include one or more ribs. The pivot lock may include two or more ribs; three or more ribs; four or more ribs; five or more ribs; or a plurality of ribs. The pivot lock may include a tube. The tube of the pivot lock may pivotally connect to the mounting plate, support plate, or both. The pivot lock and the mounting system may be in an engaged position when the pivot lock is contacting the engagement tab and the tube is within the rotational axis, the engagement tab is extending into the tube, or both. The pivot lock may be in a disengaged position when the pivot lock is not within the rotational axis, the engagement tab is not extending into the tube, or both. The pivot lock may include a key hole, a core and a cylinder. The pivot lock may include one or more ribs.

The one or more ribs may function to enhance the structural integrity of the pivot lock in substantially the same way as the one or more plate stiffeners of the support plate. The one or more ribs may alternate with one or more grooves; one or more channel; one or more trenches; or one or more gutters. The one or more ribs may prevent bending, breaking, folding, rotation, or a combination thereof of the pivot locks. The one or more ribs may contact the tube, a key hole, a cylinder, a core or any combination thereof.

A key hole may function to change the pivot lock from a locked position and an unlocked position. Specifically, inserting a key and turning the key may move a cylinder of the pivot lock and engage the cylinder of the pivot lock over the slot of the support plate. The key hole may assist the core in turning the cylinder.

The core may function to connect the key hole to the cylinder of the pivot lock. The core may be contacting the one or more ribs. The core may be on an opposite end of the tube relative to the one or more ribs. The core may contact the key hole, the cylinder, or both.

The one or more cylinders may function to secure a pivot lock and a slot of the support plate in the locked position. The cylinder may function to extend through a slot to form a locked position, prevent movement of the pivot lock, or both. The cylinder may rotate about a rotational axis so that the cylinder may move between a locked position and an unlocked position. The cylinder may be moved by turning a key in the key hole. The cylinder may be inserted into the slot of the support plate. The cylinder may be sufficiently wide to insert through the slot when the cylinder is parallel with the slot. Specifically, the cylinder may be in an unlocked position when the cylinder is parallel to the slot of the support plate. The cylinder may be "T" shaped, have a longer length portion than a width portion, be oblong, rectangular, oval, or a combination thereof. The cylinder may be sufficiently wide to prevent insertion or removal of the pivot lock when the cylinder is perpendicular with the slot. Specifically, the cylinder may be in a locked position when the cylinder is inserted through the slot and perpendicular to the slot.

The mounting system may be in a closed position or an open position. The closed position may function to show the support plate and mounting plate connected together with the hasp inserted through the locking aperture. The open position may function to show the support plate and mounting plate connected together with the hasp and locking aperture separated from each other.

The pivot lock may be moved between a locked or unlocked position. The locked position may function to secure the pivot lock and the slot of the support plate. Securing the pivot lock over the slot of the support plate may mean that the cylinder is position over and perpendicular to the slot. The unlocked position may function to show the pivot lock unsecured from the support plate. Unsecured from the support plate may mean that the cylinder is parallel with the slot of the support plate.

The rotational axis may function to show the pivotal movement of the support plate, mounting plate, the one or more hinges, the one or more bushings, the one or more hinge inserts, the pivot lock, or any combination thereof. The rotational axis may extend through the support plate, mounting plate, the one or more hinges, the one or more bushings, the one or more hinge inserts, the pivot lock, or any combination thereof. The rotational axis may spin on the equivalent of a y-axis on a Cartesian coordinate system. Rotational movement on the rotational axis may mean that mounting system (i.e., the toolbox, the support plate, mounting plate, the one or more hinges, the one or more bushings, the one or more hinge inserts, the pivot lock, or any combination thereof) is spinning about the rotational axis. Axial movement on the rotational axis may mean movement that alters the position or orientation of the rotational axis.

The pivot lock may be in an engaged position or disengaged position. The engaged position may be where the pivot lock is installed within the rotational axis to prevent axial movement of the mounting plate relative to the support plate. Specifically, the pivot lock may be in an engaged position when the engagement tab is inserted into the tube of the pivot lock; the hinge of the support plate is contacting the tube of the pivot lock; the pivot bushings are contacting the tube of the pivot lock, or any combination thereof. The disengaged position may be where the pivot lock is removed from the rotational axis so that the mounting plate and support plate may move relative to each other.

Figure 1:
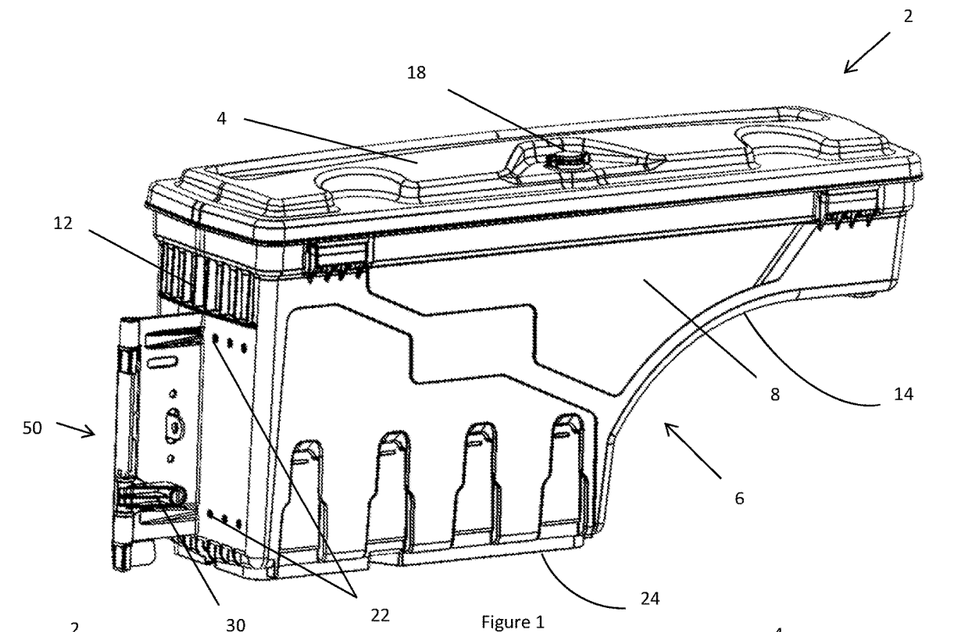
FIG. 1 is a rear perspective view of a toolbox.

FIG. 1 is a perspective view of a toolbox 2. The toolbox 2 includes a lid 4 and a container 6. The lid 4 includes a lid lock 18 that secures the lid 4 on top of the container 6. The container 6 includes an inner panel 8, an outer panel (not shown), a base 24, a front panel 14, back panel, 12. The back panel 12 includes a plurality of toolbox mounting holes 22. The back panel 12 is connected to a mounting system 50. The mounting system 50 includes the pivot lock 30.

Figure 2:
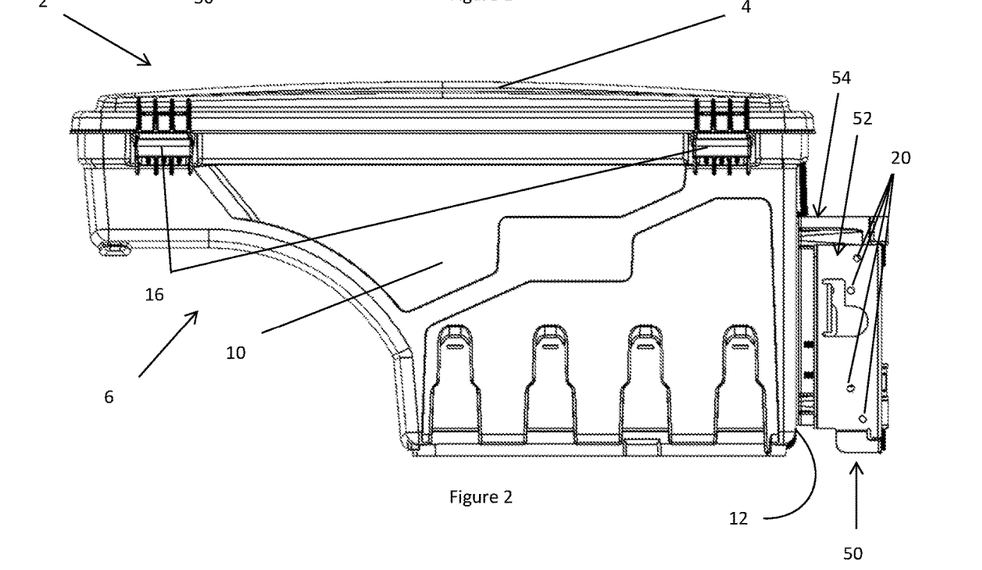
FIG. 2 is a front perspective view of a toolbox.

FIG. 2 is a perspective view of a toolbox 2. The toolbox 2 includes a lid 4 and a container 6. The lid 4 and container 6 are pivotally attached at the lid hinges 16. The container 6 includes an outer panel 10 and a back panel 12. The back panel 12 is connected to the mounting system 50. The mounting system 50 includes a support plate 54 and a mounting plate 52. The mounting plate 52 includes a plurality of truck mounting holes 20 that attach to the mounting plate 52 to the truck.

Figure 3:
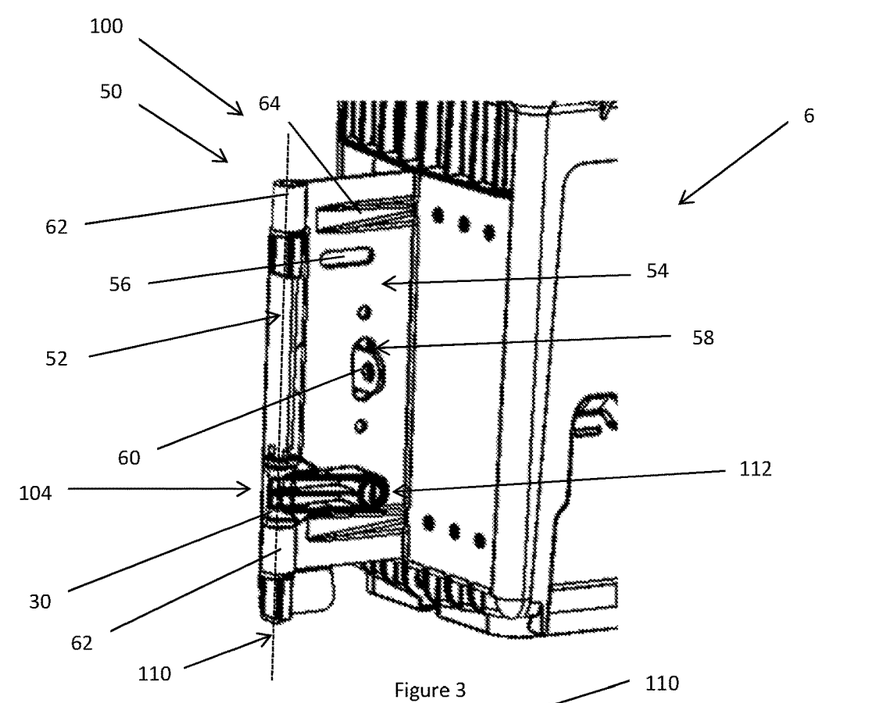
FIG. 3 is a close-up perspective view of a mounting system in a closed position with a pivot lock in a locked position and engaged position.

FIG. 3 is a perspective view of a mounting system 50 in a closed position 100 connected to a container 6. The mounting system 50 is connected on the container 6 by plate stiffener 64. The mounting system 50 includes a support plate 54 and a mounting plate 52. The support plate 54 and mounting plate 52 are pivotally connected at the hinges 62 and pivot lock 30 about the rotational axis 110. The pivot lock 30 is in an engaged position 112 and a locked position 104. The support plate 54 includes slots 56 and a locking aperture 58. The mounting plate 52 incudes a hasp 60 that inserts through the locking aperture 58 when the mounting system 50 is in a closed position 100.

Figure 4:
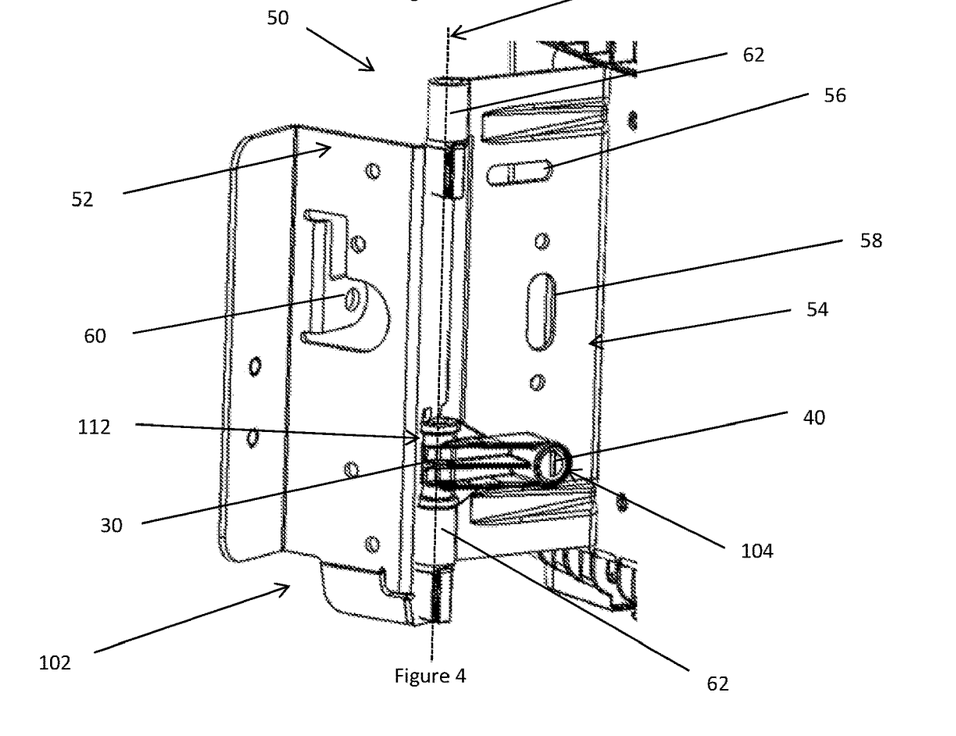
FIG. 4 is a close-up perspective view of a mounting system in an open position with a pivot lock in a locked position and engaged position.

FIG. 4 is a perspective view of a mounting system 50 in an open position 102 with a pivot lock 30 in a locked position 104 and engaged position 112. The mounting system 50 includes a mounting plate 52 and a support plate 54. The mounting plate 52 and support plate 54 are pivotally connected at the hinges 62 and pivot lock 30 about the rotational axis 110. The mounting plate 52 includes a hasp 60. The support plate 54 includes slots 56 and a locking aperture 58. The pivot lock 30 includes a key lock 40 that is opposite from a cylinder (not shown).

Figure 5:
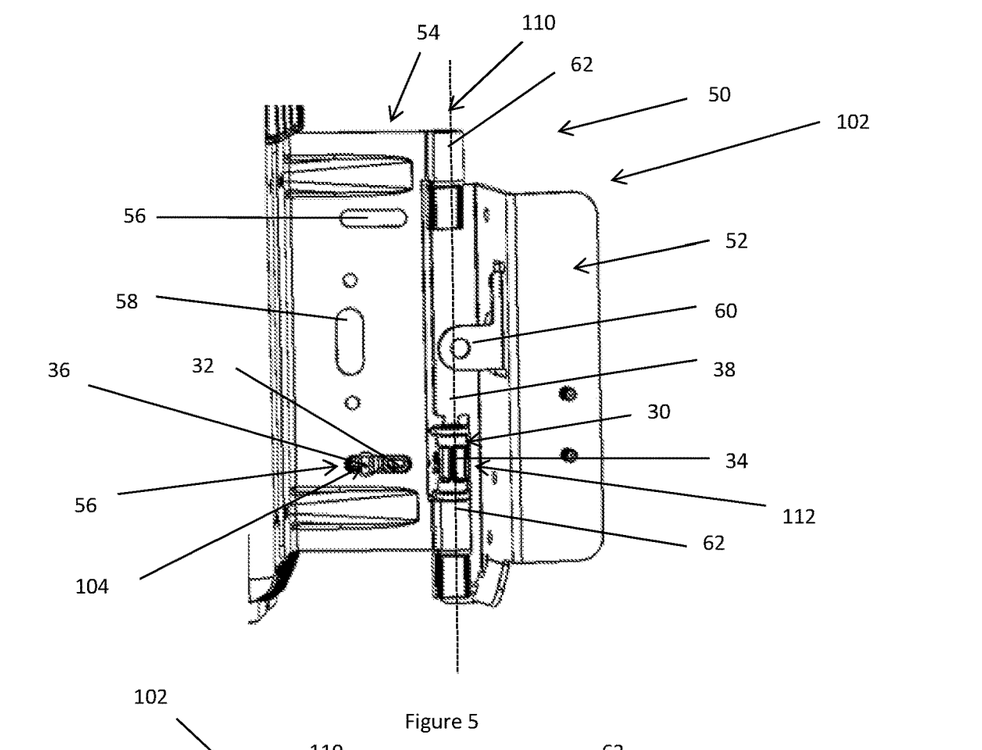
FIG. 5 is a close-up perspective view of a mounting system in an open position with the pivot lock in a locked position and engaged position.

FIG. 5 is a perspective view of a mounting system 50 in an open position 102 with a pivot lock 30 in a locked position 104 and engaged position 112. The mounting system 50 includes a mounting plate 52 and a support plate 54. The mounting plate 52 and support plate 54 are pivotally connected at the hinges 62 and pivot lock 30 about the rotational axis 110. The support plate 54 includes slots 56 and locking aperture 58. The pivot lock 30 includes a cylinder 36, alignment feature 32, and tube 34. The cylinder 36 is in a locked position 104. The pivot lock 30 is linked to the support plate 54 by the cylinder 36 through the lower slot 56. The mounting plate 52 includes an engagement tab 38 and a hasp 60. The engagement tab 38 mates with the tube 34 of the pivot lock 30 to allow pivotal movement in unison with the hinges 62.

Figure 6:
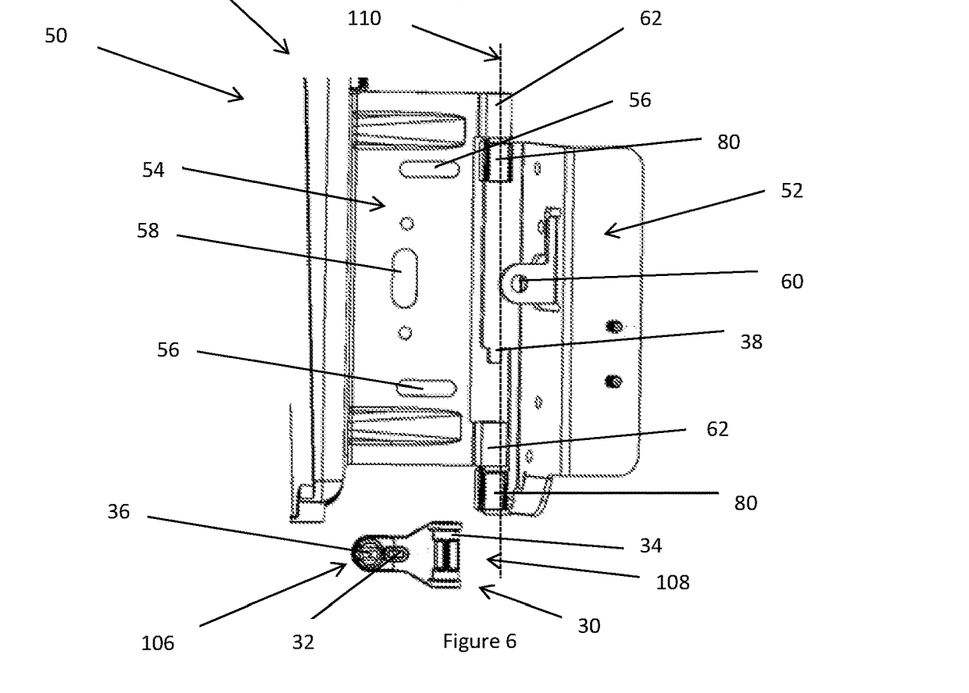
FIG. 6 is a close-up perspective view of a mounting system in an open position with a pivot lock in an unlocked position and disengaged position.

FIG. 6 is a perspective view of a mounting system 50 in an open position 102. The mounting system 50 includes a pivot lock 30 in a disengaged position 108 and unlocked position 106. The mounting system 50 includes pivot bushings 80. The mounting system 50 includes a pivotal connection between mounting plate 52 and a support plate 54 at the rotational axis 110. The mounting plate 50 includes a hasp 60. The mounting plate 50 connects to pivot bushings 80. The pivot bushings 80 pivotally connect to the hinges 62 of the support plate 54 to form the pivotal connection between the mounting plate 52 and support plate 54. The support plate 54 includes slots 56 and a locking aperture 58. The pivot lock 30 includes a cylinder 36 in the unlocked position 106; an attachment feature 32; and a tube 34 that is in the disengaged position 108. The mounting system 50 includes pivot bushings 80 and a pivot lock 30.

Figure 7:
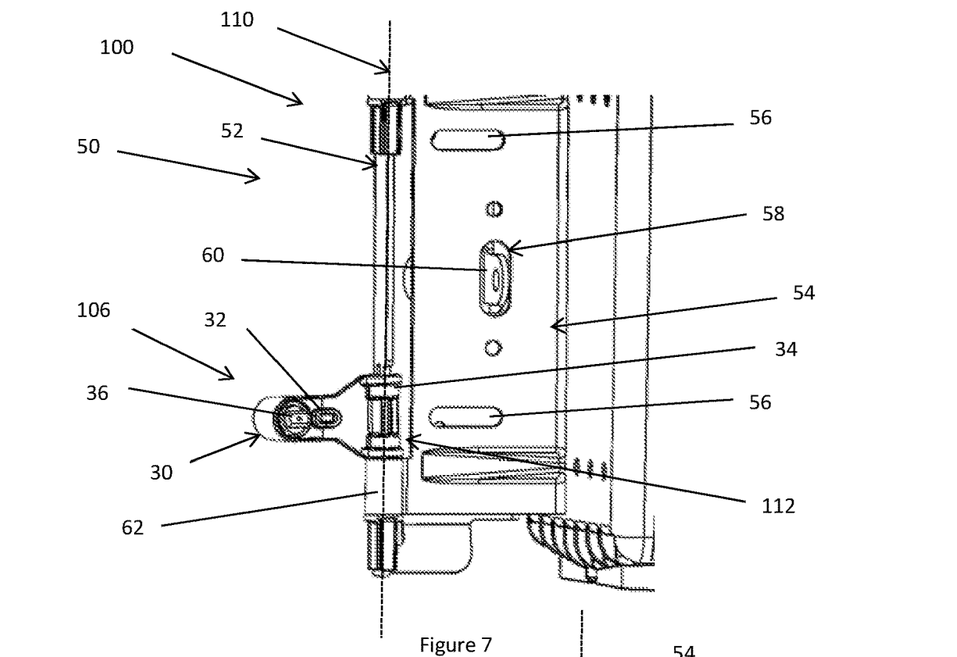
FIG. 7 is a perspective view of a mounting system in a closed position with a pivot lock in a unlocked and engaged position.

FIG. 7 is a perspective view of a mounting system 50 in a closed position 100. The mounting system 50 includes a pivot lock 30 in an unlocked position 106 and an engaged position 112. The mounting system 50 includes a mounting plate 52 and a support plate 54. The mounting plate 52 and support plate 54 are pivotally connected at the hinges 62 and pivot lock 30 about the rotational axis 110. The support plate 54 includes slots 56 and locking aperture 58. The pivot lock 30 includes a cylinder 36, alignment feature 32, and tube 38. The cylinder 36 is in an unlocked position 106. The pivot lock 30 is an unlocked position 106 and swung away from the support plate 54 and the slot 56. The hasp 60 is mated with locking aperture 58 so that a portion of the hasp 60 is on both sides of the support plate 54.

Figure 8:
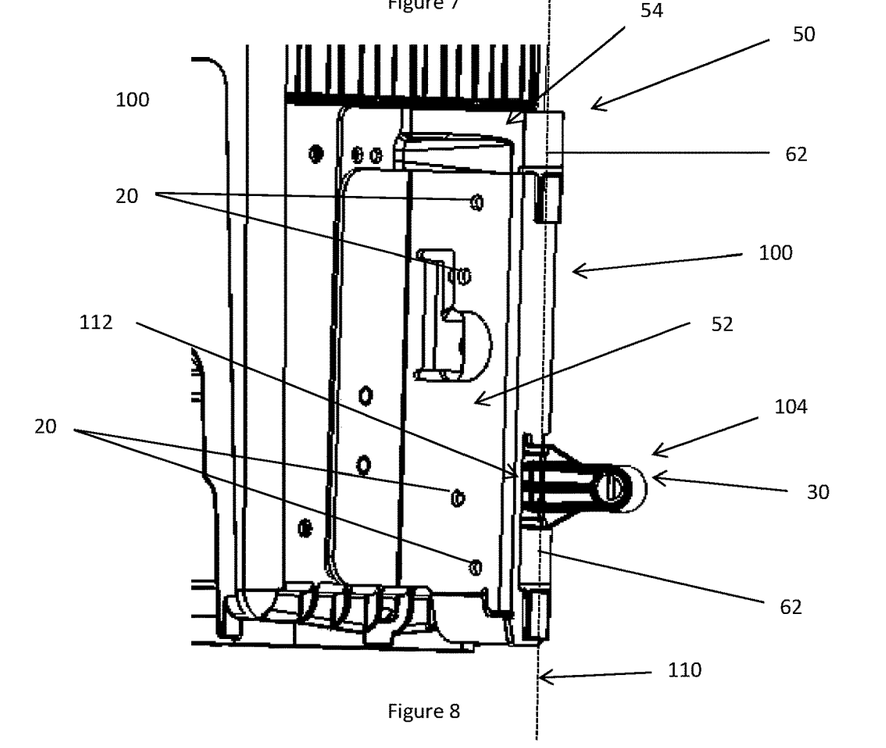
FIG. 8 is a perspective view of a mounting system in a closed position with pivot lock in an unlocked position and engaged position.

FIG. 8 is a perspective view of a mounting system 50 in a closed position 100 with a pivot lock 30 in an unlocked position 106 and engaged position 112. The mounting system 50 includes a mounting plate 52 and a support plate 54. The mounting plate 52 and support plate 54 are pivotally connected at the hinges 62 and a pivot lock 30 at the rotational axis 110. The mounting plate 54 includes a plurality of truck mounting holes 20 that connect to the truck (not shown).

Figure 9:
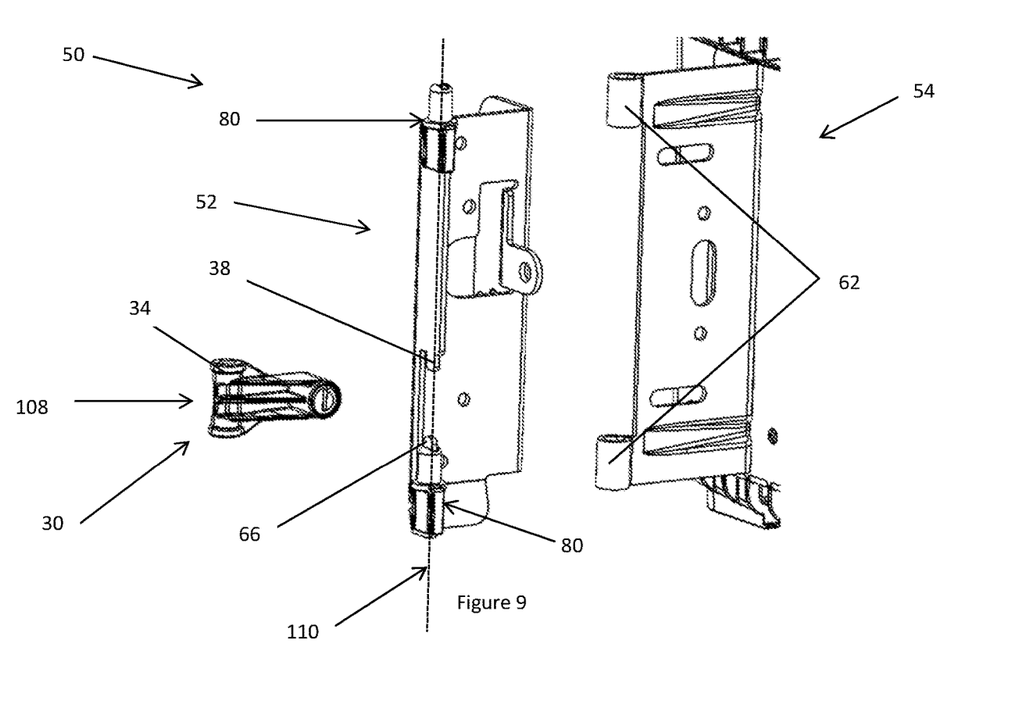
FIG. 9 is an exploded view of a support plate, mounting plate, and pivot lock.

FIG. 9 is an exploded view of a support plate 54, mounting plate 52, and pivot lock 30 of a mounting system 50. The mounting plate 52 includes hinge tabs 66 and engagement tab 38. The mounting plate 52 is attached to the pivot bushings 80 at the hinge tabs 66. The support plate 54 includes hinges 62. The hinge tabs 66 mate with the hinges 62 to form a pivotal connection. The pivot lock 30 is in a disengaged position 108. The pivot lock 30 includes a tube 34 that mates with the engagement tabs 38 to form a pivotal connection the moves about the rotational axis 110.

Figure 10:
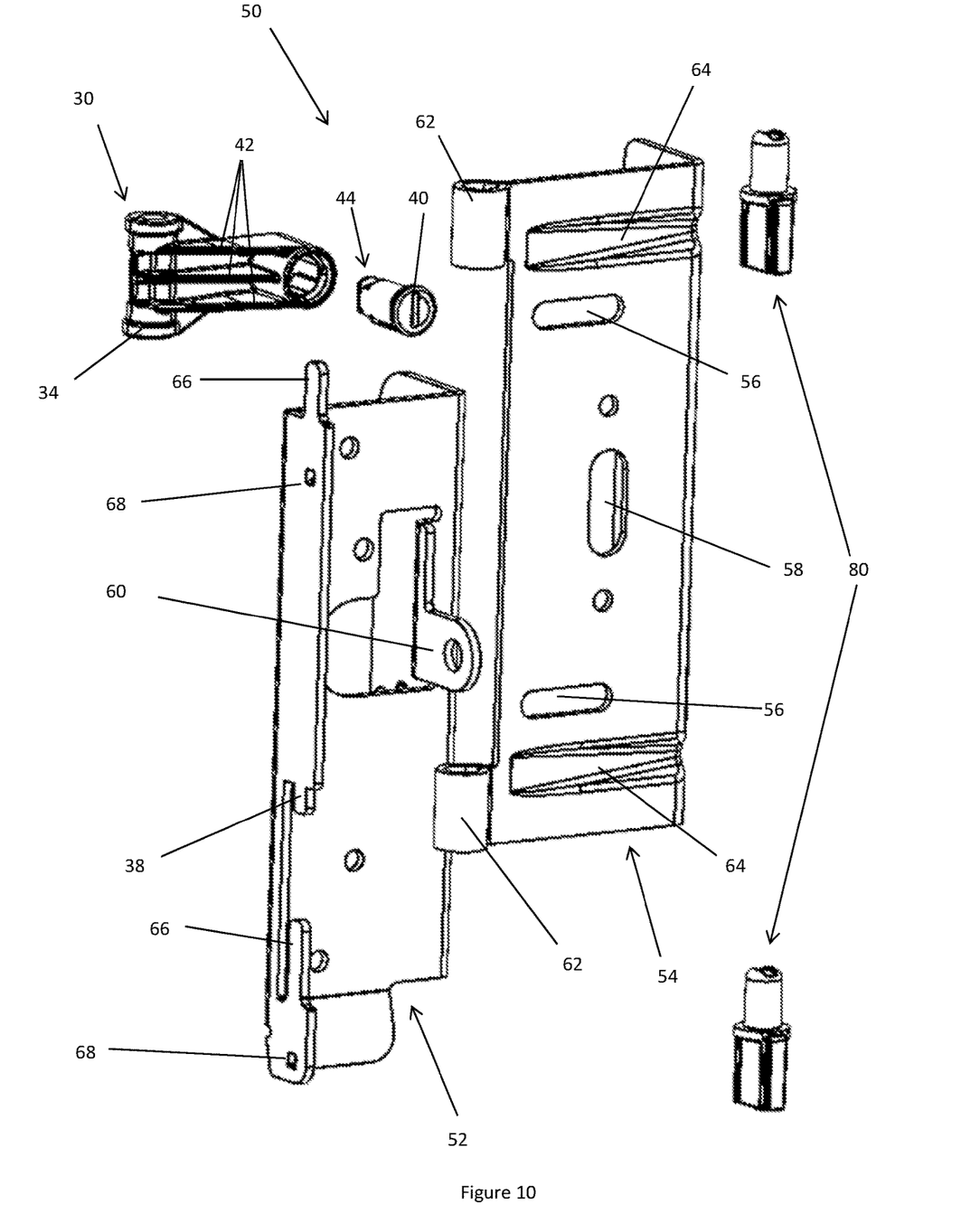
FIG. 10 is an exploded view of a mounting system.

FIG. 10 is an exploded view of a mounting system 50. The mounting system 50 includes a pivot lock 30, mounting plate 52, a support plate 54, and pivot bushings 80. The pivot lock 30 includes a plurality of ribs 42, a tube 34, and a core 44. The core 44 includes a key hole 40. The mounting plate 52 includes retainer holes 68, hinge tabs 66, an engagement tab 38, and a hasp 60. The support plate 54 includes slots 56, hinges 62, plate stiffeners 64, and a lock aperture 58.

Figure 11A:
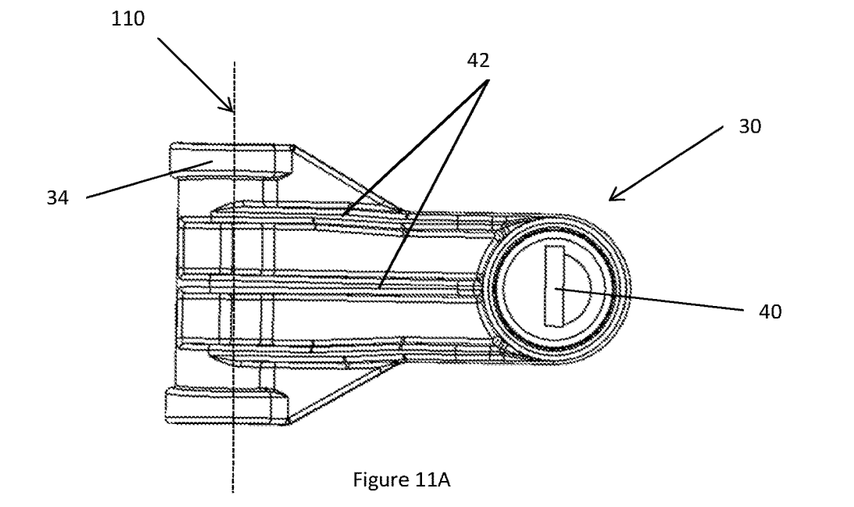
FIG. 11A is a top view of a pivot lock.

FIG. 11A is a top view of a pivot lock 30. The pivot lock 30 includes a tube 34, one or more ribs 42, and a key hole 40. The pivot lock 30 pivotally moves about the rotational axis 110.

Figure 11B:
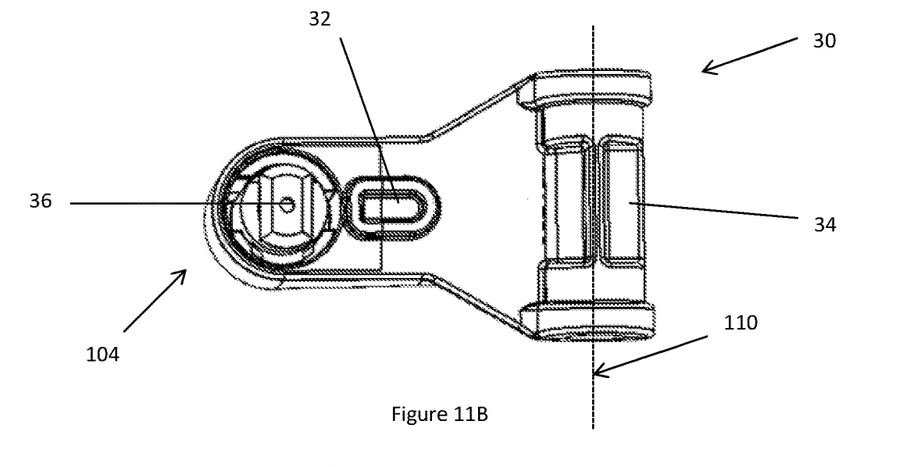
FIG. 11B is a bottom view of a pivot lock that is in a locked position.

FIG. 11B is a bottom view of pivot lock 30. The pivot lock 30 includes a cylinder 36, alignment feature 32, and a tube 34. The cylinder 36 is in a locked position 104 when the long edge of the cylinder 36 is perpendicular with the long edge of the alignment feature 32. The pivot lock 30 pivotally moves about the rotational axis 110.

Figure 11C:
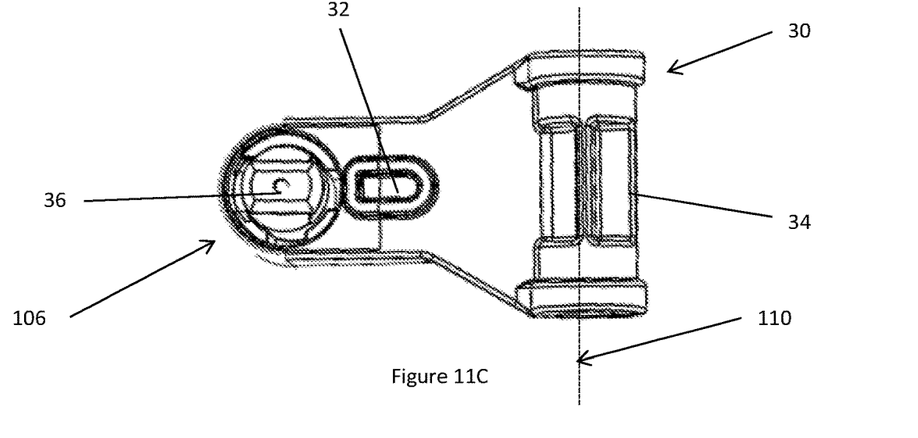
FIG. 11C is a bottom view of a pivot lock that is in an unlocked position.

FIG. 11C is a bottom view of pivot lock 30. The pivot lock 30 includes a cylinder 36, alignment feature 32, and a tube 34. The cylinder 36 is in an unlocked position 106 when the long edge of the cylinder 36 is parallel with the long edge of the alignment feature 32. The pivot lock 30 pivotally moves about the rotational axis 110.

Figure 11D:
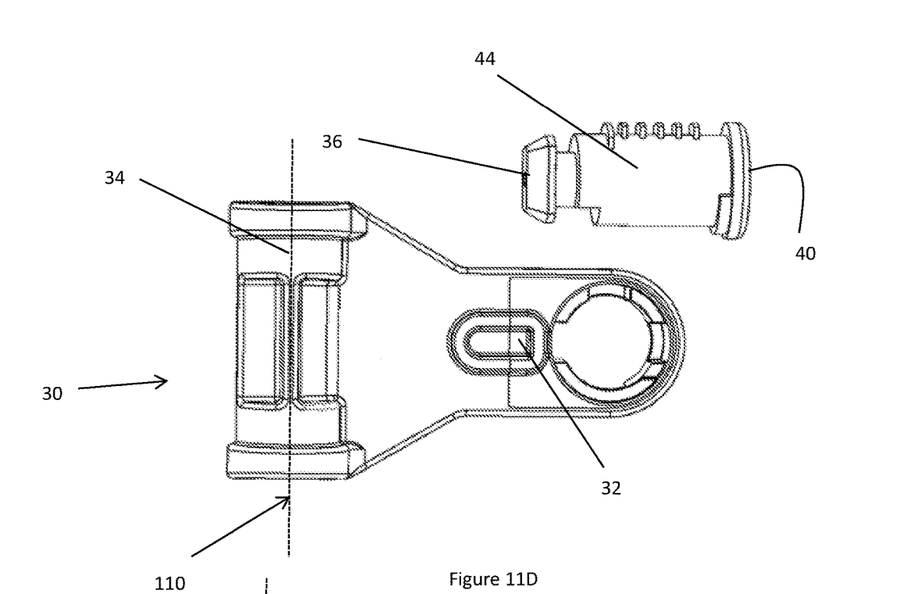
FIG. 11D is an exploded view of a pivot lock.

FIG. 11D is an exploded view of the pivot lock 30. The pivot lock 30 includes a core 44, chamber 46, tube 34, and alignment feature 32. The core 44 fits into the chamber 46. The core 44 includes the cylinder 36 and key hole 40. The pivot lock 30 pivotally moves about the rotational axis 110.

Figure 12A:
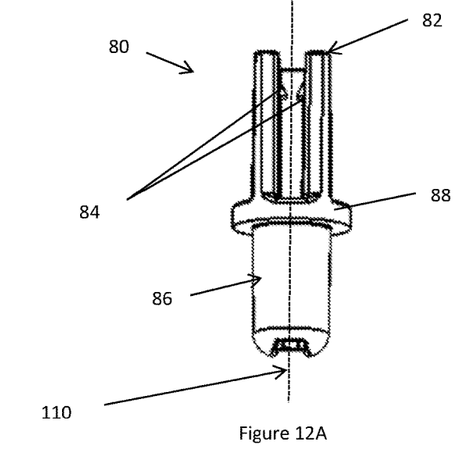
FIG. 12A is a front view of a pivot bushing.
Figure 12B:
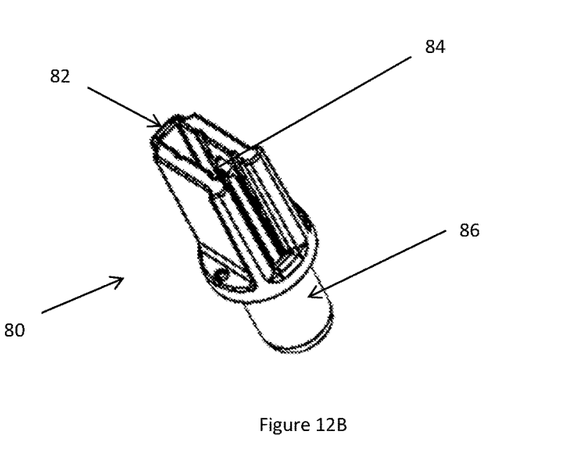
FIG. 12B is a perspective view of a pivot bushing.

FIG. 12A is a front view of a pivot bushing 80. The pivot bushing 80 includes a bushing body 86 the pivots about rotational axis 110. The bushing body 86 is in contact with the slide 82. The pivot bushing 80 includes a slide 82 and two snap tabs 84 for connection with the mounting plate (not shown). A shoulder 88 is located between the slide 82 and the bushing body 86, FIG. 12B is a perspective view of a pivot bushing 80. The pivot bushing 80 includes one or more snap tabs 84. The pivot bushing includes a slide 82 that is in contact with the bushing body 86.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Toolbox
4 Lid
6 Container
8 Inner Panel
10 Outer Panel
12 Back Panel
14 Front Panel
16 Lid Hinge
18 Lid Lock
20 Truck Mounting Holes
22 Toolbox Mounting Holes
24 Base
30 Pivot Lock
32 Alignment features
34 Tube
36 Cylinder
38 Engagement Tab
40 Key Hole
42 Rib
44 Core
50 Mounting system
52 Mounting Plate
54 Support Plate
56 Slot
58 Locking Aperture
60 Hasp
62 Hinge
64 Plate Stiffener
66 Hinge Tab
68 Retainer Holes
80 Pivot Bushing
82 Slide
84 Snap Tab
86 Bushing body
88 Shoulder
100 Closed Position
102 Open Position
104 Locked Position
106 Unlocked Position
108 Disengaged position
110 Rotational Axis
112 Engaged Position

I claim:

1. A toolbox comprising:
 a. a container;
 b. a mounting system comprising:
  i. a mounting plate adapted to connect the toolbox to a bed of a truck, the mounting plate having an engagement tab;
  ii. a support plate connected to the container;
  iii. a pivot lock pivotally connecting all or a portion of the mounting plate and the support plate, wherein the pivot lock includes a tube with a first end and an opposing second end, and the engagement tab is inserted into the first end to form an engaged position while the second end is free of connection to the engagement tab;
 wherein the mounting plate and the support plate are pivotally connected together so that the container is movable relative to the bed of the truck, and
 wherein the pivot lock assists in connecting the mounting plate and the support plate together so that the support plate is pivotally movable relative to the mounting plate, and the pivot lock prevents the support plate from being detached from the mounting plate.

2. The toolbox of claim 1, wherein the mounting plate and the support plate are connected together and movable about a rotational axis and the rotational axis extends through the pivot lock.

3. The toolbox of claim 2, wherein the pivot lock prevents axial movement of the support plate relative to the mounting plate along the rotational axis.

4. The toolbox of claim 1, wherein the pivot lock includes a lock and the pivot lock when in a locked position is connected to the support plate, the mounting plate, or both.

5. The toolbox of claim 1, wherein the mounting plate includes a hasp, and the support plate includes a locking aperture.

6. The toolbox of claim 5, wherein the hasp mates with the locking aperture when the mounting system is in a closed position.

7. The toolbox of claim 5 wherein the mounting system cannot freely swing when the hasp is secured over the support plate.

8. The toolbox of claim 4, wherein the container is covered by a lid, and the lid includes a lid lock.

9. The toolbox of claim 8, wherein the lid lock is moved by a key from a locked position, an unlocked position, or both; and
 wherein the pivot lock is moved by the same key from the locked position, an unlocked position, or both.

10. The toolbox of claim 2, wherein the support plate includes one or more slots and one or more hinges, and the mounting plate includes one or more hinge tabs.

11. The toolbox of claim 10,
 wherein the pivot lock pivotally moves about the rotational axis while in an engaged position.

12. The toolbox of claim 11, wherein the pivot lock includes a cylinder that mates with the one or more slots of the support plate; and
 wherein the cylinder secures the pivot lock over the slot of the support plate in a locked position.

13. The toolbox of claim 10 wherein the mounting system includes one or more pivot bushings that mate with the one or more hinges of the support plate that pivotally move about the rotational axis of the mounting system.

14. The toolbox of claim 13 wherein the one or more pivot bushings include a bushing body, and wherein the one or more hinges of the support plate form a bearing surface when the bushing body of the one or more pivot bushings and the one or more hinges of the support plate mate.

15. The toolbox of claim 13, wherein the one or more pivot bushings include a slide; and
   wherein the slide of the one or more pivot bushings and the one or more hinge tabs of the mounting plate mate to form a friction fit.

16. The toolbox of claim 14, wherein the one or more pivot bushings include one or more snap tabs, and the mounting plate includes one or more retainer holes; and
   wherein the one or more snap tabs grip the one or more retainer holes to assist the hinge tab to form a friction fit.

17. The toolbox of claim 13, wherein the one or more pivot bushings are an intermediary between the one or more hinges of the support plate and the mounting plate, and the one or more hinges and the mounting plate are free of contact with each other during movement of the toolbox about the rotational axis.

18. The toolbox of claim 10, wherein the second end of the tube abuts one of the one or more hinges.

19. The toolbox of claim 1, wherein the pivot lock is removably connected to the mounting plate and the support plate.

20. The toolbox of claim 2, wherein the pivot lock freely rotates about the rotational axis independently of the mounting plate and the support plate.

* * * * *